United States Patent
Dart et al.

(10) Patent No.: US 7,614,009 B2
(45) Date of Patent: Nov. 3, 2009

(54) METHOD FOR CONTROLLING FILENAME DISPLAY FOR IMAGE AND VIDEO FILE TYPES

(75) Inventors: Scott E. Dart, Lynnwood, WA (US); Colin R. Anthony, Kirkland, WA (US); Jingyang Xu, Redmond, WA (US); Jae P. Park, Redmond, WA (US); Benjamin L. Perry, Seattle, WA (US); Tyler K. Beam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 10/809,050

(22) Filed: Mar. 24, 2004

(65) Prior Publication Data

US 2005/0216864 A1   Sep. 29, 2005

(51) Int. Cl.
*G06F 3/00* (2006.01)
*G06F 3/048* (2006.01)

(52) U.S. Cl. .............. 715/781; 715/721; 715/810; 715/835; 715/838; 715/839

(58) Field of Classification Search ............ 715/721, 715/839, 838, 835, 810, 781
See application file for complete search history.

(56) References Cited

U.S. PATENT DOCUMENTS

| | | | |
|---|---|---|---|
| 5,721,853 A | 2/1998 | Smith | |
| 5,835,088 A | 11/1998 | Jaaskelainen, Jr. | |
| 6,496,206 B1 | 12/2002 | Mernyk et al. | |
| 6,622,168 B1 | 9/2003 | Datta | |
| 6,651,216 B1 * | 11/2003 | Sullivan et al. | 715/503 |
| 6,750,890 B1 | 6/2004 | Sugimoto | |
| 6,915,489 B2 | 7/2005 | Gargi | |
| 6,938,215 B2 | 8/2005 | Kobayashi et al. | |
| 7,003,736 B2 | 2/2006 | Kanevsky et al. | |
| 2002/0075312 A1 * | 6/2002 | Amadio et al. | 345/764 |
| 2002/0135621 A1 * | 9/2002 | Angiulo et al. | 345/838 |
| 2002/0184496 A1 | 12/2002 | Mitchell et al. | |
| 2004/0210767 A1 | 10/2004 | Sinclair et al. | |
| 2005/0081043 A1 | 4/2005 | Evans et al. | |
| 2005/0125736 A1 * | 6/2005 | Ferri et al. | 715/747 |
| 2005/0198319 A1 | 9/2005 | Chan et al. | |

OTHER PUBLICATIONS

Munro, J., "Parental Guidance Suggested," parental control software reviews, PC Magazine, Jul. 1, 2003, 5 pages.

* cited by examiner

*Primary Examiner*—William L Bashore
*Assistant Examiner*—Stephen Alvesteffer
(74) *Attorney, Agent, or Firm*—Senniger Powers LLP

(57) ABSTRACT

A method, system and article of manufacture suitable for rendering a graphical user interface including at least one viewable graphical element, the graphical element having a filename associated therewith, the filename being absent from the user interface.

19 Claims, 8 Drawing Sheets

METHOD FOR CONTROLLING FILENAME DISPLAY FOR IMAGE AND VIDEO FILE TYPES

FIELD OF THE INVENTION

The present invention generally relates to graphical user interfaces (GUIs) such as those used with general-purpose computers and other types of computing devices. More specifically, the present invention generally relates to GUIs that display windows and/or folders containing computer-generated icons.

BACKGROUND OF THE INVENTION

In the computer industry, use of GUIs is well known for enabling a user to select a particular file of data (such as a word-processing file or a graphics file), from a large available selection. A GUI is a type of display format that enables a user to operate a computer by pointing to pictorial representations, such as windows and icons, displayed on a screen device. A window usually has the shape of a rectangle displayed on a screen. Regardless of shape, a window affords a user workspace within a program and/or operating system. Generally, a user may move the window displayed on the screen, change its size and shape, enlarge it to fill the entire screen, close it entirely, or change how much of the contents of a window are displayed.

To navigate within a GUI, such as to select a particular file to be opened, most operating systems employ a screen cursor or pointer, typically displayed as a small arrow, that allows a user to select individual points on the screen. In operation, the cursor may be moved to a desired location in response to movements of a pointing device (e.g., a mouse, trackball, or equivalent) by the user. In addition to affecting cursor movement, most pointing devices include one or more switches or buttons for specifying additional user input or user events. Because many user choices may be implemented through the use of a pointing device, the need for users to memorize special commands or keystrokes is lessened.

A standard GUI may provide access to a hierarchy of containers into which individual files can be organized. For example, a set of files may be placed in a folder, and a set of folders may be placed in another folder. This layered effect, which is associated with most general GUIs, provides for exceptional organizational features that may be utilized by a user.

When a folder is opened in the context of a GUI, there is typically displayed a rectangular space on the screen, and within the rectangular space is displayed a set of icons, each icon being associated with one file (such as a text or graphics file) in the folder. As previously mentioned, the rectangular space may be generally considered as a window in the context of GUIs. Once a window is opened, the contents of the window are typically displayed as icons that have specific relation to folders and/or file types. For example, word-processing documents are generally all assigned icons of identical basic appearance, such as a sheet of graphically displayed paper with a folded corner, or a stylized capital W embodied within the icon. The use of similar appearing icons for similar items allows users to quickly identify the type of file that is associated with an icon. File names are also displayed adjacent to icons in order to aid a user in identifying the type of file associated with the icon.

FIG. 1 illustrates a conventional GUI window. More specifically FIG. 1 illustrates a window 10 that contains a plurality of icons 20 in a partitioned window section 30. The window 10 also includes a supplemental window section 40 that includes menus 50 and 60. Furthermore, the window 10 also includes a standard bar area 70 and a title bar 80.

As is illustrated, the window section 30 includes various icons 20 of differing appearances, each with an associated filename. For example, the icons with the associated filenames "track01.MP3" and "track02.MP3 are related to audio files, the icon associated with "outline.doc" is related to a word-processing file, and the icon with the associated filename "timwpic.jpg" is related to an image file, as is the icon with the associated filename "P01022003.jpg." The general descriptive nature of the indicated file names, along with the icons, give a user of an operating system including such a conventional window 10 the ability to determine the general contents of a file before actually opening the file.

As is illustrated in FIG. 1, one or more files that include machine-generated file names may also be displayed. An example of a machine language generated file name is "P01022003.jpg." A machine language generated file name generally does not convey any information to the user viewing the conventional window 10. Therefore, the need to include such a file name in window 10 is open to discussion. Moreover, it is questionable whether icons in general require the use of filenames.

SUMMARY OF THE INVENTION

An exemplary embodiment of the present invention provides a method that renders a graphical user interface including at least one viewable graphical element, the graphical element having a filename associated therewith, the filename being absent from the user interface.

Another exemplary embodiment of the present invention provides a system that includes an arrangement for generating a graphical user interface including at least one viewable graphical element, the graphical element having a filename associated therewith, the file name being absent from the user interface.

Yet another exemplary embodiment of the present invention provides an article of manufacture for use in programming a processor, the article of manufacture comprising at least one computer readable storage device including at least one computer program embedded therein that causes the processor to perform the method of rendering a graphical user interface including at least one viewable graphical element, the graphical element having a filename associated therewith, the filename being absent from the user interface.

Another exemplary embodiment of the present invention provides a method for reviewing one of a data associated with a filename and a format of the filename, the filename having an associated icon; determining if a filename is displayed based on the reviewing step; and congregating icons without displayable filenames in at least one row, the number of icons congregated in the at least one row being greater than a comparable row with icons having filenames being displayed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE EXEMPLARY EMBODIMENTS

In order to ensure clarity in the description related to exemplary embodiments according to the present invention, the following terms are defined:

A "thumbnail" is a quantity of data that is derived from a larger quantity of data, such as a file. A thumbnail is obtained by opening one image page from a file and optically reducing or scaling the image to a smaller size. Alternatively, discrete portions of data from a file can be pulled from the file, such as keywords, a pre-written or artificially derived summary of the data, a title, a list of column headings, any text strings that are formatted to be of larger than usual type size, which would be consistent with headlines, etc. This data may be integrated with an icon to provide a user visual representation of the contents of a folder or file without having to actually open the folder or file.

A "folder" is a term which can be applied to any organizational structure that can hold one file, a plurality of files, and/or a folder or multiple folders.

An "icon" is a basic bitmap of a predetermined design, which a user can identify as relating to a file, or at least a file of a certain type. In accordance with the description of the exemplary embodiments according to the present invention, an icon may or may not include associated thumbnail data.

Figure 2:
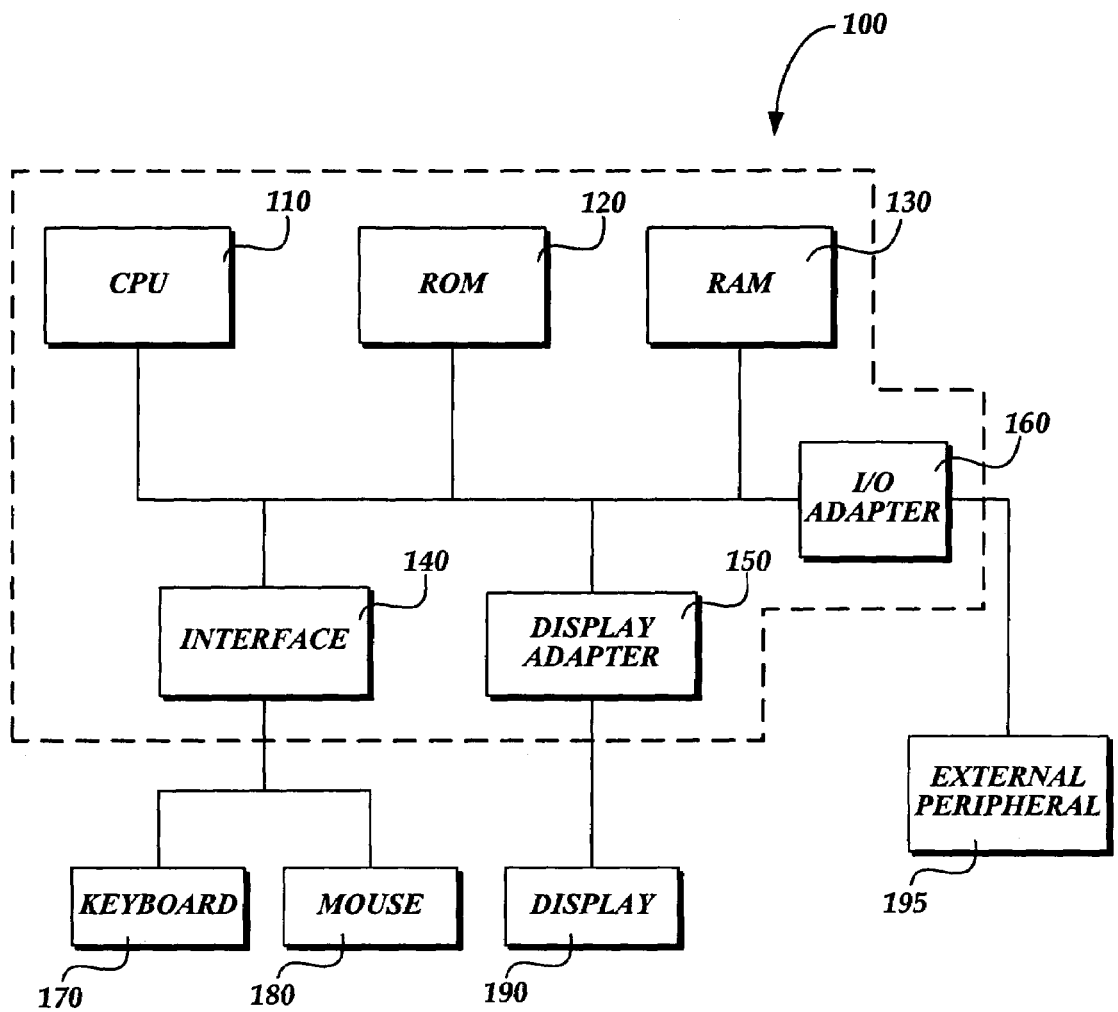
FIG. 2 illustrates a block diagram of a system suitable for providing an exemplary operating environment for an exemplary embodiment of the present invention.

FIG. 2 illustrates a block diagram of a system 100 suitable for providing an exemplary operating environment for an exemplary embodiment of the present invention. The system 100 illustrated in FIG. 2 for operating an exemplary embodiment of the present invention includes a central processing unit (CPU) 110, a read-only memory (ROM) 120, and a random access memory (RAM) 130. In addition, the system 100 includes an interface 140, a display adapter 150, and an I/O adapter 160. The foregoing elements are illustrated as being generally connected and associated as one cohesive unit. However, this is done by way of illustration only. The illustrated elements may be fashioned in a variety of manners well known to those skilled in the art.

The system 100 may also include various external devices. Illustrated external devices include a keyboard 170, a mouse 180, a display 190, and an external peripheral 195. The external peripheral 195 may be, for example, a printer, a storage device, etc.

This description of the exemplary embodiments according to the present invention will often refer to the system 100 as a computer system. However, it should be understood that the system 100 may be implemented in various operational devices. For example, the system 100, or a similar system, may be implemented in a personal digital assistant (PDA), a mobile telephone, a handheld computer, an information kiosk, etc. Therefore, it should be clear that the system 100 illustrated in FIG. 2 should be construed as exemplary and not limiting of embodiments of the present invention. Thus, the system 100 should be as illustrative of the environment in which exemplary embodiments described herein may be used.

Figure 3:
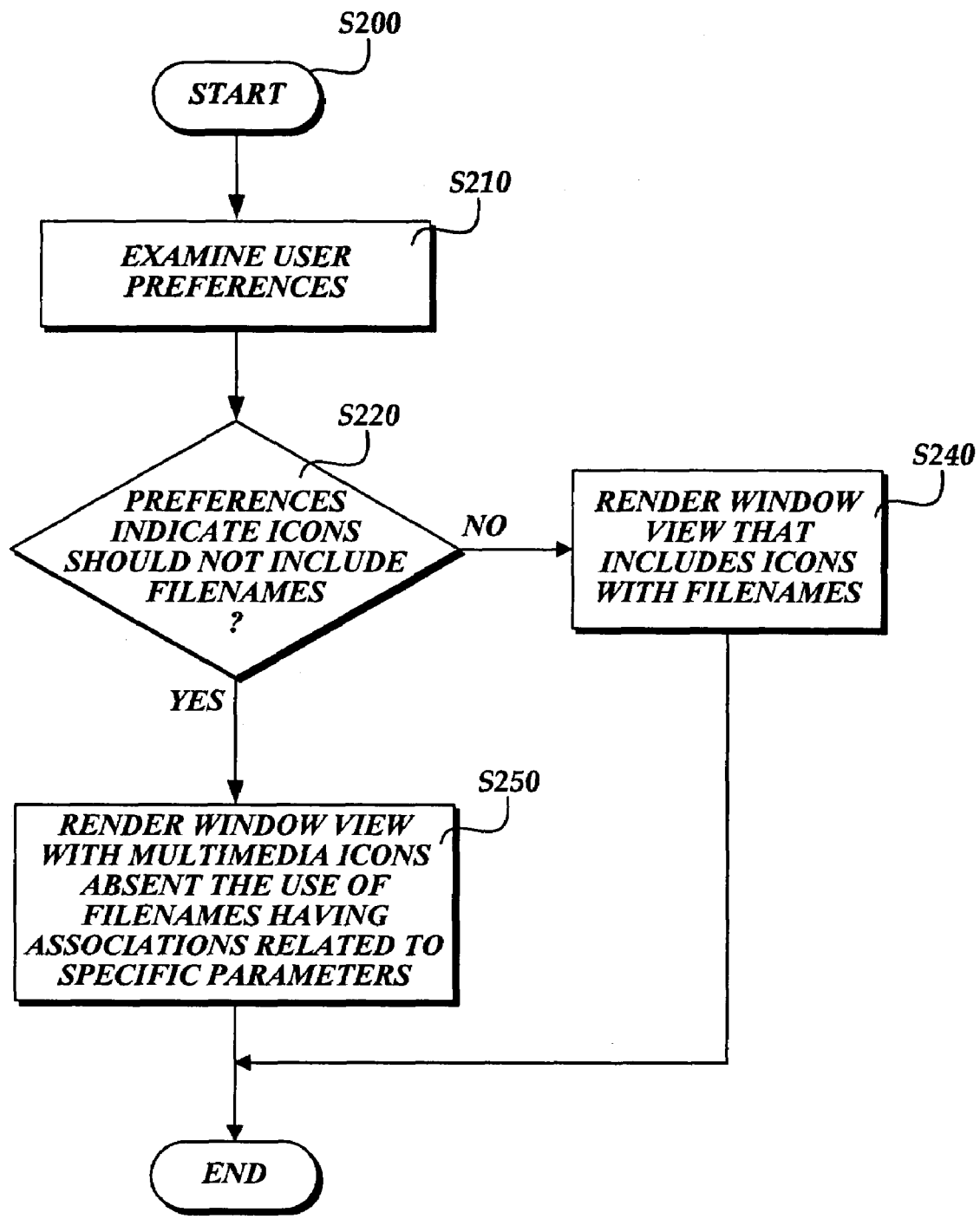
FIG. 3 is a flowchart illustrating a process for illustrating icons without the presence of filenames.

FIG. 3 is a flowchart illustrating an exemplary process formed in accordance with this invention for illustrating icons without the presence of filenames. The exemplary process illustrated in FIG. 3 includes a start block S200 that generally represents the beginning of the process illustrated in the figure. In particular, the process illustrated in FIG. 3 may commence upon the opening of a window associated with a GUI. Opening a window within a GUI normally requires a user to interface with the system 100. In particular, a user may make a keystroke on the keyboard 170 or click on a button associated with the mouse 180, which causes the rendering of the window. Activity with, and displaying of, a window is provided as a user-interfaceable representation by way of the display 190.

Figure 1:
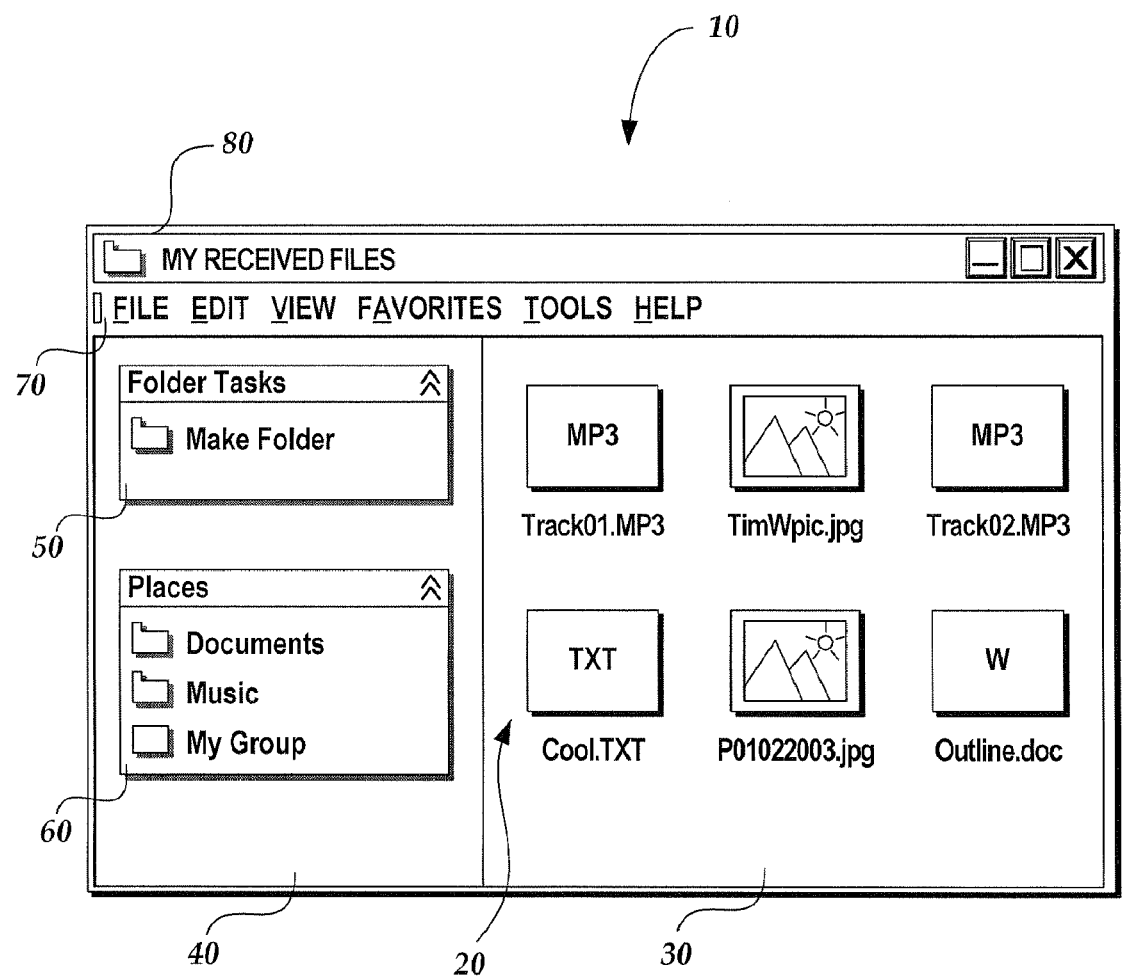
FIG. 1 illustrates a conventional window view displayable in a GUI.

Before a window is rendered on the display 190, the process illustrated in FIG. 3 analyzes any user preferences that may be defined within the system 100 (block S210). These user preferences generally define the manner in which the window being rendered on the display 190 should display icons. That is, the preferences are examined to determine if certain icons should or should not include the use of filenames (block S220). If the preferences do not indicate that specific filenames should be removed, then a window is rendered on the display 190 that includes icons that each include the use of filenames (block S240). Such a window that includes the use of icons each having filenames is illustrated in FIG. 1. On the other hand, if the preferences indicate that some or all of the icons should not include the use of filenames, the system 100 may render a window 400, such as that illustrated in FIG. 4 (block S250).

Figure 4:
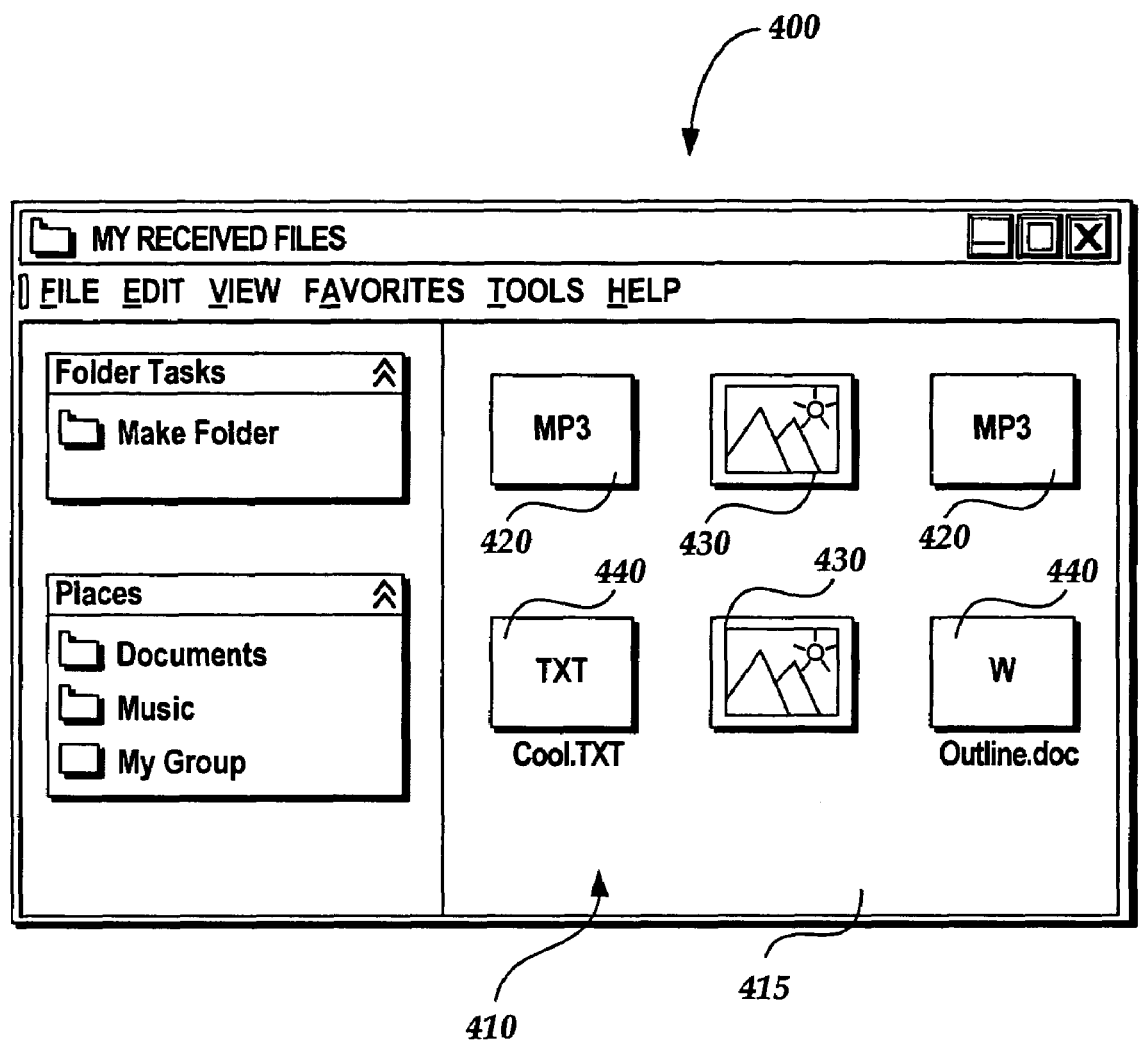
FIG. 4 illustrates a window including various icons without filenames, in accordance with an exemplary embodiment of the present invention.

FIG. 4 illustrates a window 400 that includes various icons without filenames. The window 400 includes various icons 410 some with and some without filenames displayed in a window space 415. In particular, in the case of FIG. 4, icons 420 and 430, depicted as multimedia (audio and/or image), icons have not been rendered with filenames. In contrast, icons 440, depicted as relating to or associated with text based files, have been rendered with associated filenames. Therefore, as is illustrated in FIG. 4, the two audio file icons 420 and the two image file icons 430 are illustrated without their associated filenames. However, the text-based associated icons 440 have been rendered with their associated filenames intact. Therefore, in the case of the window 400 illustrated in FIG. 4, the preferences examined in block S210, illustrated in FIG. 3, direct the rendering of window 400 without the use of filenames in conjunction with icons having associated with multimedia files.

Although FIG. 3 identifies that user preferences are examined when determining the manner in which a window is rendered on the display 190, general system parameters may also dictate how icons in a window are displayed. For example, a folder or other container may be designated as a storage area for a specific type of file. In particular, it may be specifically designated by the system 100 as a folder that is to contain primarily multimedia file types. In this case, by virtue of the fact that a folder is designated as a multimedia folder type, the system may automatically dictate that icons associated with multimedia files and stored in such a designated folder will not include the use of filenames.

The preferences, whether user or system related, may be stored in various elements within the system 100. For example, user preferences may be stored and retrieved from the RAM 130 and/or the external peripheral 195 (in the event the peripheral 195 is a storage device), while system parameters may be stored in the ROM 120. The storage and retrieval of preferences related to the displaying of icon filenames pertains to each of the exemplary embodiments discussed herein.

Referring again to FIG. 4, as is illustrated in the figure, the removal of the filenames from icons 420 and 430 creates additional space in the window space 415. In order to capitalize on this additional space obtained with the removal of filenames from icons 420 and 430, the computer system 100 may position the icons 410 in closer proximity to each other. This may result in an increased number of icons being displayable in the window space 415.

In the case of the icons 410 displayed in the window space 415, both horizontal and vertical adjustments may be made to increase the amount of space available to display icons 410 in the window space 415. For example, icons 420 and 430, in the top row, may be shifted closer together, since the absence of filenames prevents the possibility that filenames from adjacent icons will overlap. Furthermore, the second row of icons 410 may be shifted upward, as a group, in order to facilitate rendering an additional row of icons in the same window space 415. Clearly, based upon the number of filenames removed, horizontal and/or vertical shifting of icons may be made in many different ways.

Another repositioning technique may also be implemented in conjunction with the exemplary embodiments of the present invention. In particular, in the case of the icons displayed in FIG. 4, it may be desirable to position the icon 430 in the second row adjacent to an icon that has also had its filename removed. For example, the mentioned icon 430 may be repositioned adjacent to any one of the other icons that had filenames removed. Both this repositioning technique along with the technique described in the preceding paragraph may be used alone or in combination together. Moreover, the described techniques may be used with each of the exemplary embodiments described herein.

Figure 5:
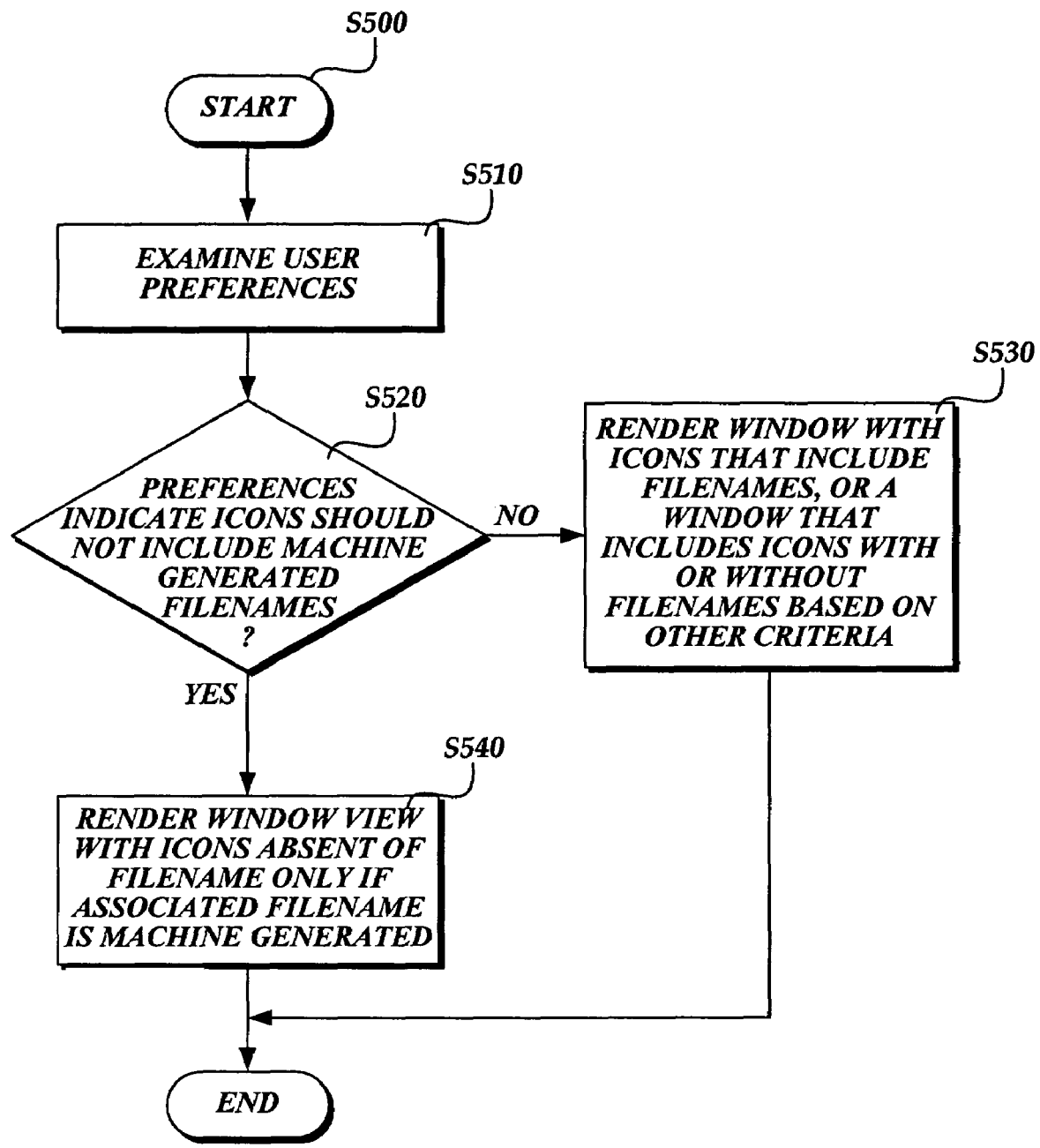
FIG. 5 is a flowchart illustrating a process for rendering certain icons without filenames, in accordance with another exemplary embodiment of the present invention.

FIG. 5 shows a flowchart illustrating a process for rendering certain icons without filenames, in accordance with another exemplary embodiment of the present invention. As is illustrated in FIG. 5, the exemplary embodiment includes a start block S500 that generally represents the beginning of the process illustrated in the figure. In particular, the process illustrated in FIG. 5 may commence upon the opening of a folder associated with a GUI. Opening a window within the GUI normally requires a user to interface with the system 100. In particular, a user may make a keystroke on the keyboard 170 or click on a button associated with the mouse 180, which causes the rendering of the window. Activity with, and displaying of, a window is provided as a user-interfaceable representation by way of the display 190.

Before a window is rendered on the display 190, the process illustrated in FIG. 5 analyzes any user preferences that may be defined within the system 100 (block S510). These user preferences generally define the manner in which the window being rendered on the display 190 should display icons. That is, the preferences are examined to determine if certain icons should not include the use of machine generated filenames (block S520). If the preferences do not indicate that specific filenames should be removed, then a window is rendered on the display 190 that includes icons that each include the use of filenames (block S530), or renders icons without filenames based upon other criteria. Such a window that includes the use of icons each having filenames is illustrated in FIG. 1. On the other hand, if the preferences indicate that the icons should not include the use of machine generated filenames, the system 100 may render a window 600, such as that illustrated in FIG. 6 (block S540).

Figure 6:
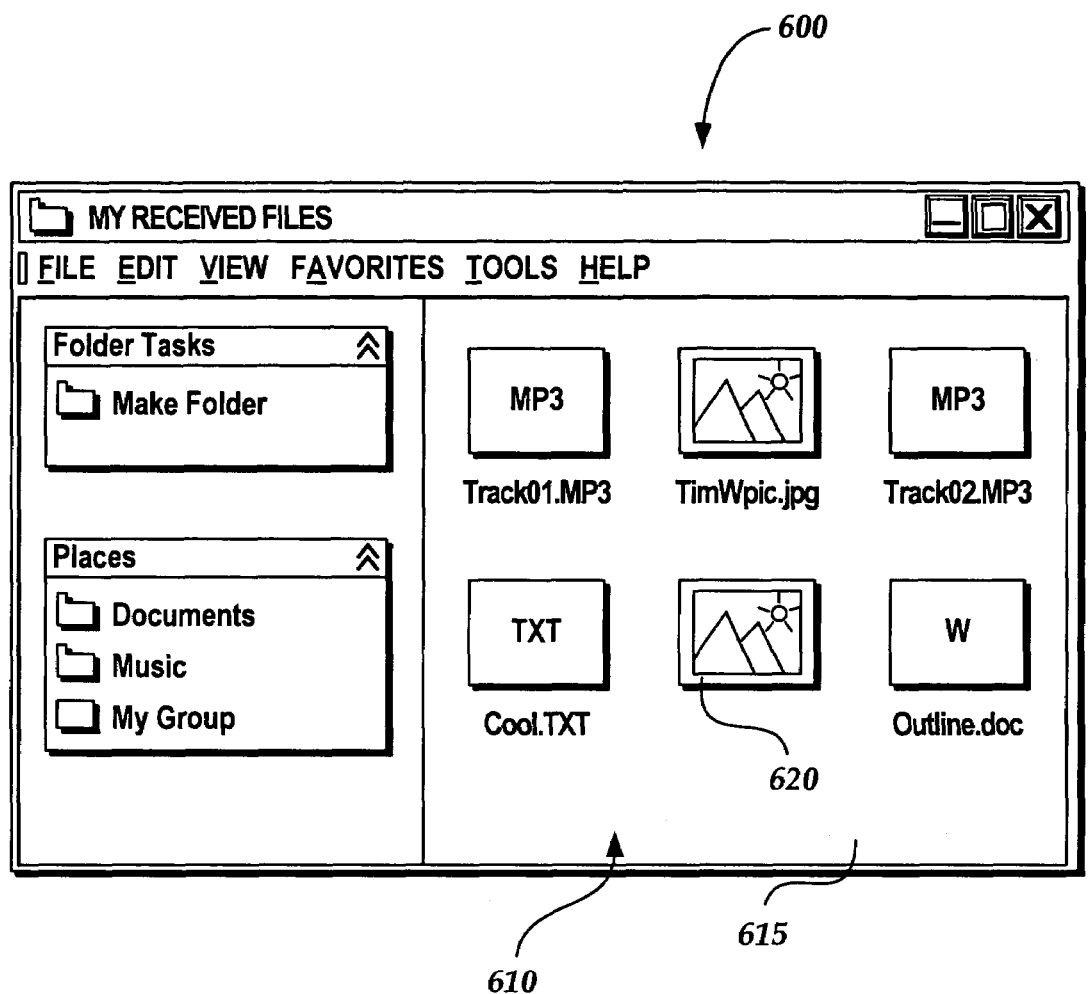
FIG. 6 illustrates a window displayed in accordance with another exemplary embodiment of the present invention.

FIG. 6 illustrates a window displayed in accordance with another exemplary embodiment of the present invention. FIG. 6 illustrates the window 600 that includes various icons 610 with or without filenames displayed in a window space 615. In particular, in the case of FIG. 6, an icon 620 has not been rendered with a filename. However, as is illustrated in FIG. 6, all other icons have been rendered with associated filenames maintained. The icon 620 was rendered without its associated filename because the filename is machine generated. The machine generated icon can be seen in FIG. 1. Therefore, in the case of the window 600 illustrated in FIG. 6, the preferences examined in block S510, illustrated in FIG. 5, direct the rendering of window 600 without the use of filenames in conjunction with icons having associated machine generated filenames.

Figure 7:
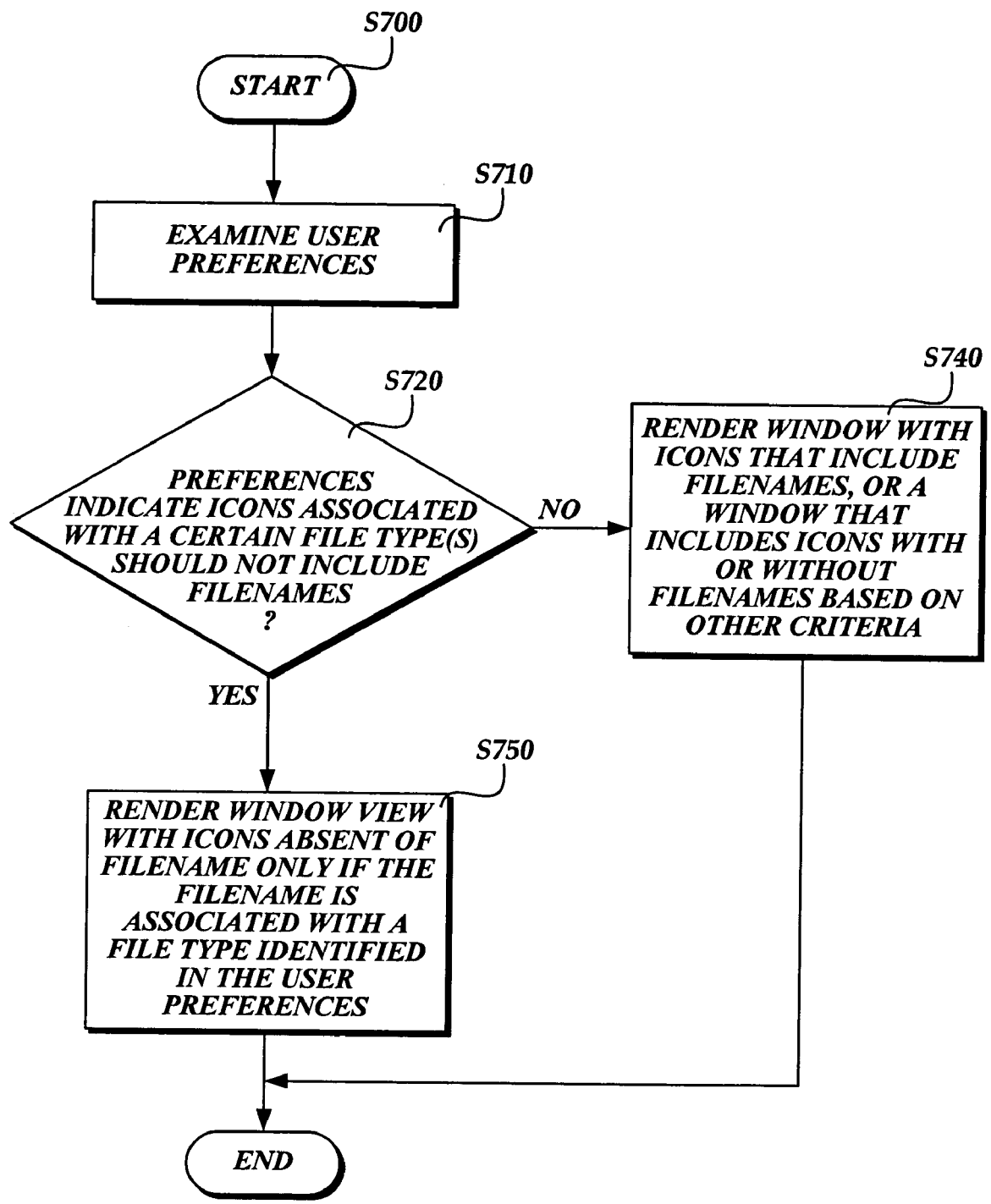
FIG. 7 is a flowchart illustrating a process for rendering certain icons without filenames, in accordance with yet another exemplary embodiment of the present invention.

FIG. 7 a flowchart illustrating a process for rendering certain icons without filenames, in accordance with yet another exemplary embodiment of the present invention. As is illustrated in FIG. 7, the exemplary embodiment includes a start block S700 that generally represents the beginning of the process illustrated in the figure. In particular, the process illustrated in FIG. 7 may commence upon the opening of a folder associated with a GUI. Opening a window within the GUI normally requires a user to interface with the system 100. In particular, a user may make a keystroke on the keyboard 170 or click on a button associated with the mouse 180, which causes the rendering of the window. Activity with, and displaying of, a window is provided as a user-interfaceable representation by way of the display 190.

Before a window is rendered on the display 190, the process illustrated in FIG. 7 analyzes any user preferences that may be defined within the system 100 (block S710). These user preferences generally define the manner in which the window being rendered on the display 190 should display icons. That is, the preferences are examined to determine if certain icons should not include the use of filenames (block S720). If the preferences do not indicate that specific filename types should be removed, then a window is rendered on the display 190 that includes icons that each include the use of filenames (block S740), or renders icons without filenames based upon other criteria. Such a window that includes the use of icons each having filenames is illustrated in FIG. 1. On the other hand, if the preferences indicate that the certain icons should not include the use of filenames, the system 100 may render a window 700, such as that illustrated in FIG. 8 (block S750). In this case, the preferences indicate JPEG filenames, or image files, should not be displayed with associated icons (see FIG. 8).

Figure 8:
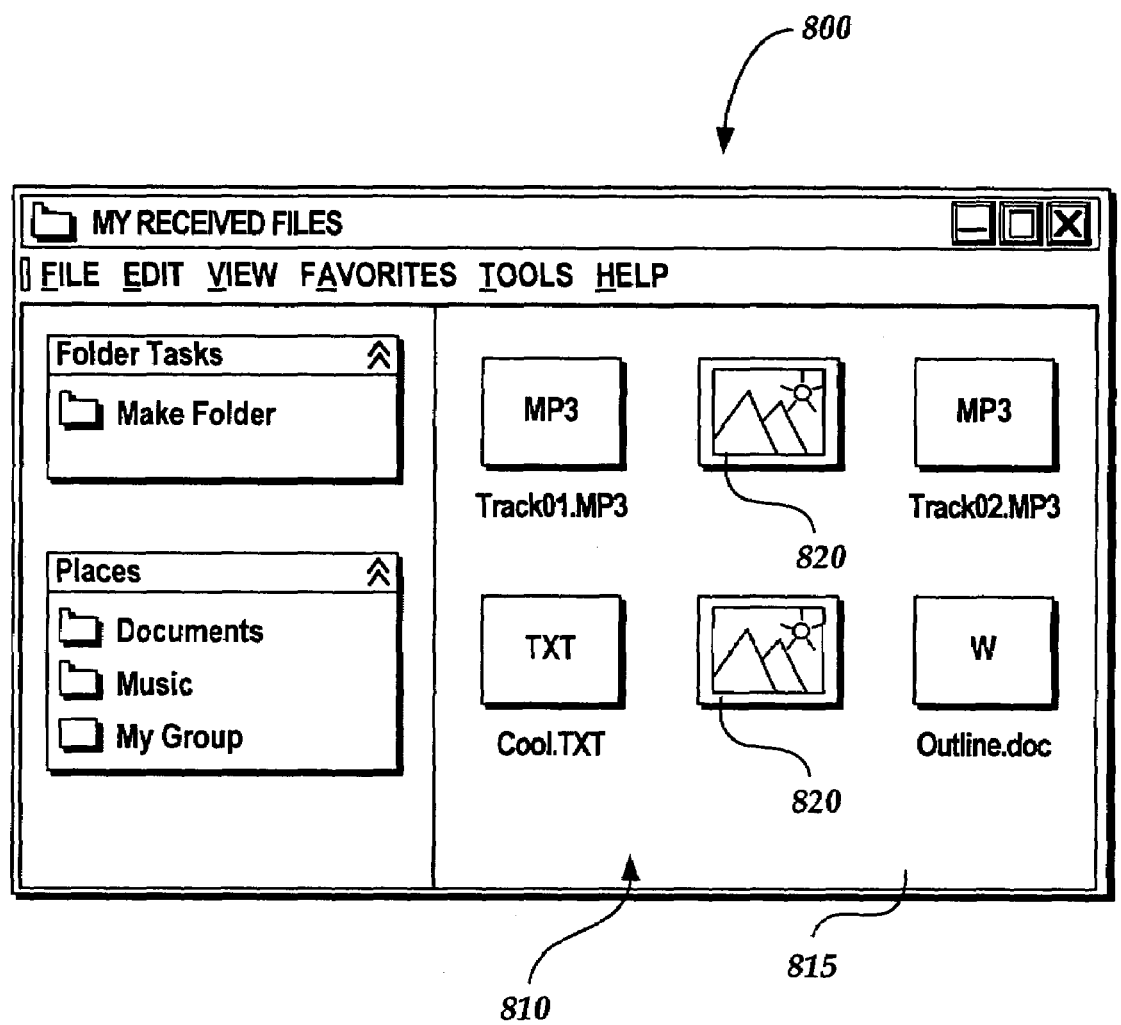
FIG. 8 illustrates a window displayed in accordance with yet another exemplary embodiment of the present invention.

FIG. 8 illustrates a window displayed in accordance with yet another exemplary embodiment of the present invention. FIG. 8 illustrates a window 800 that includes various icons 810 with or without filenames displayed in a window space 815. In particular, in the case of FIG. 8, icons 820 have not been rendered with a filenames. However, as is illustrated in FIG. 8, all other icons have been rendered with associated filenames maintained. The icons 820 were rendered without the associated filename, respectively, because the each filename relates to an image (based upon .jpg extension). The JPEG icons with filenames can be seen in FIG. 1. Therefore, in the case of the window 800 illustrated in FIG. 8, the preferences examined in block S710, illustrated in FIG. 7, direct the rendering of window 800 without the use of filenames in conjunction with icons having associated image filenames.

While the exemplary embodiments of the invention have been illustrated and described, it will be appreciated that various changes can be made therein without departing from the spirit and scope of the present invention.

The embodiments of the invention in which an exclusive property or privilege is claimed are defined as follows:

1. A method for reducing the amount of space occupied by a plurality of graphical elements including at least one graphical element having a filename when the plurality of graphical elements is rendered on a graphical user interface, the graphical user interface comprising a window section, the method comprising:

determining for each graphical element of the plurality of graphical elements if a filename is or is not to be displayed with the graphical element when the graphical element is rendered, the determination being based on the type of object that the graphical element represents, the determination resulting in a filename not being displayed with the graphical element when the graphical element is rendered if data associated with a component of the filename is determined to be image data or multimedia data;

for each graphical element of the plurality of graphical elements whose filename is to be displayed with the graphical element when the graphical element is rendered, rendering the graphical element and the filename in the window section of the graphical user interface; and for each graphical element of the plurality of graphical elements whose filename is not to be displayed with the graphical element when the graphical element is rendered, adjusting the alignment of the plurality of graphical elements in the window section of the graphical user interface to reduce the amount of space occupied by the plurality of graphical elements and rendering the graphic element, but not the filename, in the window section of the graphical user interface, adjusting the alignment of the plurality of graphical elements in the window section of the graphical user interface including aligning a graphic element more closely with surrounding graphical elements by reducing the space therebetween.

2. The method according to claim 1, wherein the at least one graphical element is an icon.

3. The method according to claim 1, wherein determining if the filename is or is not to be displayed on the graphical user interface is based upon an attribute of the filename.

4. The method according to claim 3, wherein the filename is not to be displayed if the filename is determined to be a machine generated file name.

5. The method according to claim 3, wherein the filename is not to be displayed if the filename has a filename extension related to multimedia files.

6. The method according to claim 5, wherein the filename is not to be displayed if the filename extension relates to one of image, video and audio.

7. The method according to claim 1, wherein when the plurality of graphical elements whose filenames are not to be displayed are rendered, adjusting at least a row of the plurality of graphical elements whose filenames are not to be displayed so that the graphical elements are proximately closer to one another as compared to a positioning of the graphical elements whose filenames are to be displayed.

8. The method according to claim 7, further comprising shifting a row of graphical elements whose filenames are to be displayed vertically upward, the shifting of the row being possible as a result of the filenames being absent from the graphical elements whose file names are not to be displayed.

9. An article of manufacture for use in programming a processor, the article of manufacture comprising at least one tangible computer readable storage device including at least one computer program embedded therein that causes the processor to perform the method of claim 1.

10. A system, comprising a processing unit, memory, and a display, the memory storing processor executable instructions that, when executed, cause the generation of a graphical user interface, the graphical user interface comprising a window section, the graphical user interface including at least one graphical element displayed in the window section of the graphical user interface, the graphical element having a filename associated therewith, the filename being absent from the graphical user interface as a result of a determination that data associated with a component of the filename is image data or multimedia data, the graphical element being aligned more closely with surrounding graphical elements displayed in the same window section of the graphical user interface by reducing the space therebetween, the reduction resulting from the filename being absent from the graphical user interface, the graphical user interface including at least one other graphical element and a filename associated therewith displayed in the window section of the graphical user interface, said filename being visibly displayed in said window section of the graphical user interface as a result of a determination that data associated with a component of said filename is not image data or multimedia data.

11. The system according to claim 10, wherein the system is one of a computer, a personal digital assistant, a mobile device and an information device.

12. The system according to claim 10, wherein the at least one graphical element is an icon.

13. The system according to claim 10, wherein the graphical user interface includes a plurality of graphical elements, at least some of the plurality of graphical elements having associated filenames not visible on the graphical user interface in accordance with one of an attribute of data associated with the filenames and a format of the filenames.

14. The system according to claim 13, wherein the attribute is multimedia data.

15. The system according to claim 14, wherein the multimedia data is one of audio data, image data and video data.

16. The system according to claim 13, wherein the format of the filenames is automatically produced by the system.

17. The system according to claim 13, wherein the graphical user interface includes a plurality of graphical elements and associated filenames visibly displayed in the window section of the graphical user interface, and wherein the plurality of graphical elements having associated filenames not visible on the graphical user interface are displayed on the display device in at least one contiguous row, each of the plurality of graphical elements being closer proximate to one another in comparison to a rendering of the plurality of graphical elements with associated filenames visible on the graphical user interface.

18. The system according to claim 17, wherein a row of graphical elements positioned directly below the row of graphical elements having associated filenames not visible on the graphical user interface is shifted upward, the shifting upward rendering the upward shifted row of graphical elements closer in proximity to the plurality of graphical elements having associated filenames not visible on the graphical user interface in comparison to what the positioning of the row of graphical elements would have been if the row of graphical elements had not been shifted upwardly.

19. A method, comprising:

reviewing one of a data associated with a filename and a format of the filename, the filename having an associated icon;

determining if a filename is or is not to be displayed based on the review, the determination resulting in a filename not being displayed with the graphical element when the graphical element is rendered in a window section of a graphical user interface if data associated with a component of the filename is determined to be image data or multimedia data; and rendering a plurality of graphical elements for concurrently displaying in the same window section of a graphical user interface, said plurality of graphical elements including a first set of graphical elements having filenames determined not to be displayed with said first set of graphical elements in the graphical user interface, and said plurality of graphical elements including a second set of at least one graphical element having a file name determined to be displayed with said graphical element in the graphical user interface; and congregating icons of the first set of graphical elements in at least one row in the window section of the graphical user interface, the number of icons congregated in the at least one row being greater than a comparable row with icons whose filenames are to be displayed.

* * * * *

UNITED STATES PATENT AND TRADEMARK OFFICE
CERTIFICATE OF CORRECTION

| | | |
|---|---|---|
| PATENT NO. | : 7,614,009 B2 | Page 1 of 1 |
| APPLICATION NO. | : 10/809050 | |
| DATED | : November 3, 2009 | |
| INVENTOR(S) | : Dart et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Nineteenth Day of October, 2010

David J. Kappos
*Director of the United States Patent and Trademark Office*